United States Patent [19]

Busby

[11] Patent Number: 4,654,851
[45] Date of Patent: Mar. 31, 1987

[54] MULTIPLE DATA PATH SIMULATOR

[75] Inventor: W. Ray Busby, Richardson, Tex.

[73] Assignee: Rockwell International Corporation, El Segundo, Calif.

[21] Appl. No.: 685,270

[22] Filed: Dec. 24, 1984

[51] Int. Cl.$^4$ ............................................. G01R 31/28
[52] U.S. Cl. ................................. 371/27; 324/73 R; 371/23; 371/15; 371/28
[58] Field of Search .................. 371/1, 28, 25, 23, 24, 371/27, 15; 324/73 R, 73 AT

[56] References Cited

U.S. PATENT DOCUMENTS

| 3,027,542 | 3/1962 | Silva | 371/28 |
| 3,047,841 | 7/1962 | Kondi | 371/28 X |
| 3,737,637 | 6/1973 | Frankeny et al. | 371/28 |
| 4,497,056 | 1/1985 | Sugamori | 371/1 |
| 4,564,943 | 1/1986 | Collins et al. | 371/28 |
| 4,577,318 | 3/1986 | Whitacre et al. | 371/1 |

Primary Examiner—Charles E. Atkinson
Attorney, Agent, or Firm—V. Lawrence Sewell; H. Fredrick Hamann

[57] ABSTRACT

A multiple data path simulator for use with a data generator having a clock output and a data output including a data delay with a predetermined number of outputs, a data multiplexer for selecting one of the outputs, a clock delay with a predetermined number of outputs corresponding to those of the data delay, a clock multiplexer for selecting one of the clock delay outputs and a gray code counter for determining which outputs are selected is disclosed. Multiplexers determine which outputs are main and which are standby. A second clock multiplexer is one time delay behind the first clock multiplexer and provides clock to the gray code counter when counting up. The gray code counter uses the output of the first clock multiplexer when counting down.

10 Claims, 6 Drawing Figures

MULTIPLE DATA PATH SIMULATOR

The Government has rights in this invention pursuant to Contract No. N00123-82-C-0195 awarded by the Naval Regional Contracting Office, Long Beach, Calif.

DESCRIPTION

1. Technical Field

The present invention relates generally to equipment and methods for testing units which receive electronic signals from more than one path so that the paths may differ and even vary in time delay. Such units could have to operate with multiple data paths for purposes of redundancy or inadvertently such as by the creation of ghosts by reflection.

2. Background Art

The principal components of the present invention such as gray code counters, digital delay lines, delay registers and multiplexers are well known in the art. The general idea of using a random or pseudo random data generator for supplying input data to a unit under test, and then comparing the input data to the output data is also well known. The need and desire to test units which use both main and standby data and clock signal is also of long standing.

3. Disclosure of Invention

A multiple data path simulator according to the present invention is adjustable, bidirectional, rate-controlled, interposed in the data path and serves as a digital time delay data source. It includes means for supplying a reference clock and a reference data signal which in one form includes a data generator and in another form merely connections which can be attached to a data generator. The multiple data path simulator also includes means for counting up or down in a gray code sequence which in a preferred form counts up to the top of the sequence and then down to the bottom of the sequence so that there is never a transition from all ones to all zeros or vice versa. Means for delaying the reference clock signal and the reference data signal for a selected time is provided. The selected time increases or decreases responsive to the gray code counting means. The delaying means includes means for delaying data from the data generator with a predetermined number of outputs of differing time delays, a data multiplexer for selecting as an output one of the outputs of the data delaying means, means for delaying clock signal from the clock output of the data generator with outputs of differing time delays corresponding to the differing time delays of the data delaying means, and a clock multiplexer for selecting as an output one of the outputs of the clock signal delaying means. In such an arrangement, the data multiplexer and the clock signal multiplexer select from the predetermined outputs of the data delaying means and the clock signal delaying means respectively responsive to the counting means. Means is also provided for determining between the selected delayed outputs and the reference outputs, which can be delayed in certain embodiments, which are main outputs of the simulator and which are standby outputs.

In one arrangement, the data delaying means includes a delay register and the clock signal delaying means includes a digital delay line. A preferred arrangment of the invention also includes a second clock multiplexer which is substantially the same as the first multiplexer. The second clock multiplexer is connected in a such way that its output is always one delay time later than the output of the first clock multiplexer. The gray code counting means uses the output of the first clock multiplexer for its clock signal when counting down and the output of the second clock multiplexer for its clock signal when counting up so that the logic zero interval can be chosen on both the currently selected output and the next selected output in switching which outputs of the delay means are the selected outputs of the multiplexers.

These and other objects, advantages and features of this invention will be apparent from the following description taken with reference to the accompanying drawing, wherein is shown the preferred embodiments of the invention.

BEST MODE FOR CARRYING OUT THE INVENTION

Figure 1:
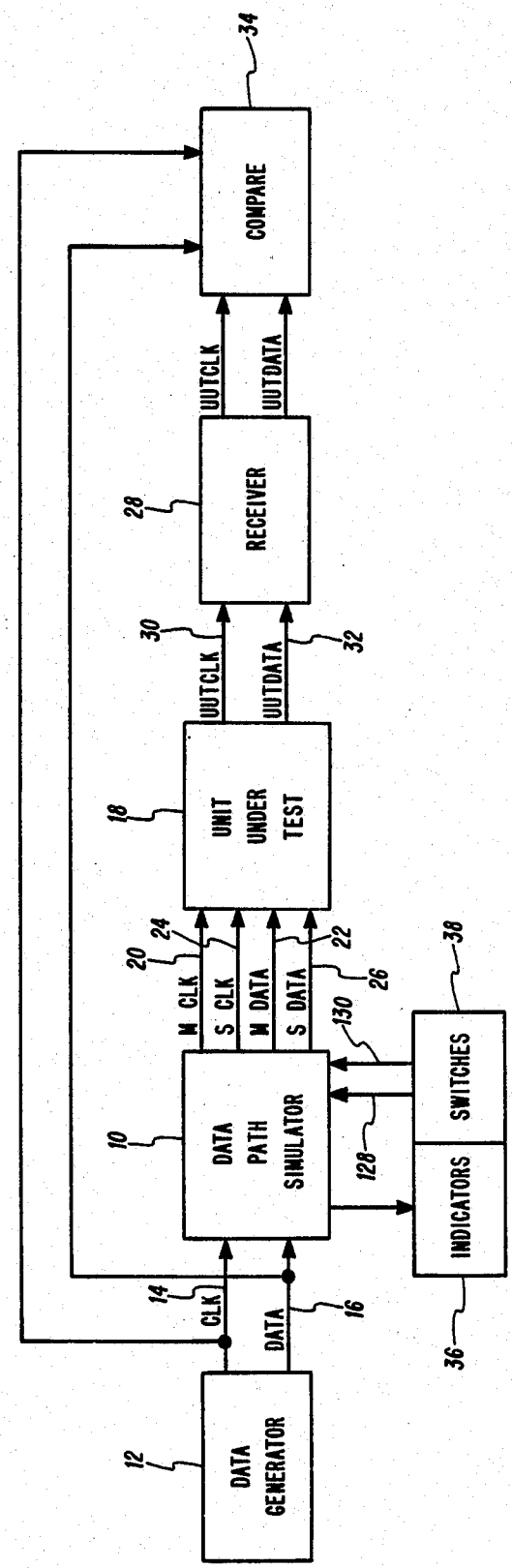
FIG. 1 is a block diagram representation of a unit being tested according to the present invention by use of a data path simulator according to the present invention.

Referring now to the drawing, and in particular to FIG. 1, a multiple data path simulator according to the present invention is referred to generally by reference numeral 10, and in some embodiments can include data generator 12. The clock and data outputs of data generator 12 are electrically connected by leads 14 and 16 respectively as inputs to data path simulator 10. Data path simulator 10 is connected to a unit under test 18, supplying main clock and data inputs as well as standby clock and data inputs to the unit through connections 20, 22, 24 and 26 respectively. Unit under test 18 selects either the main clock and data or the standby clock and data to operate on and passes the selected clock and data on to a receiver 28 by means of electrical connections 30 and 32 respectively. The unit under test clock and data are then passed on to some means 34 for comparing them to the clock and data from data generator 12.

During the course of its operation, multiple data path simulator 10 passes on some information to visual or audible indicators 36, and switches 38 are used by a human operator to control certain aspects of the operation.

Figure 2:
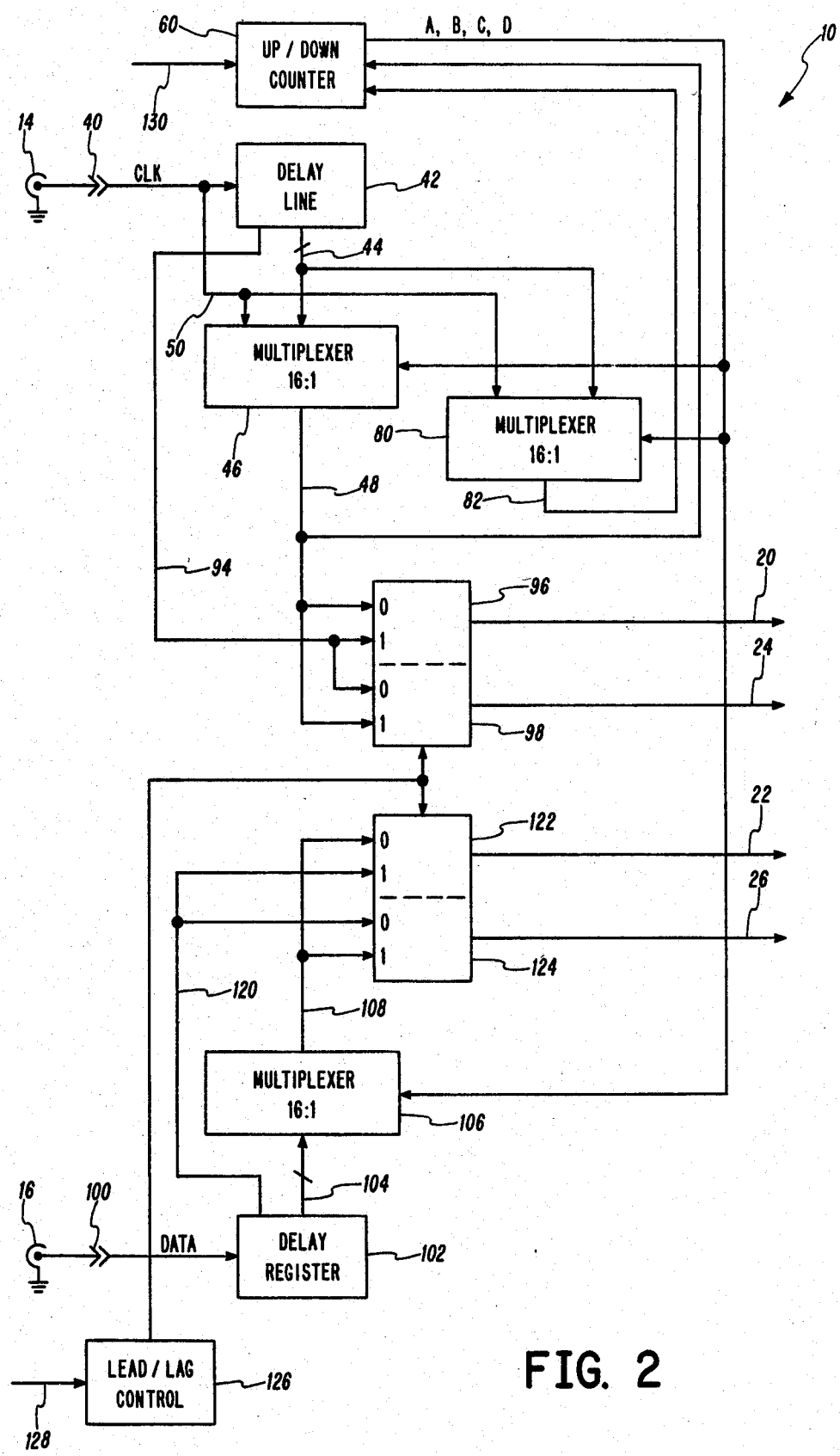
FIG. 2 is a block diagram representation of a multiple data path simulator according to the present invention.
Figure 4A:
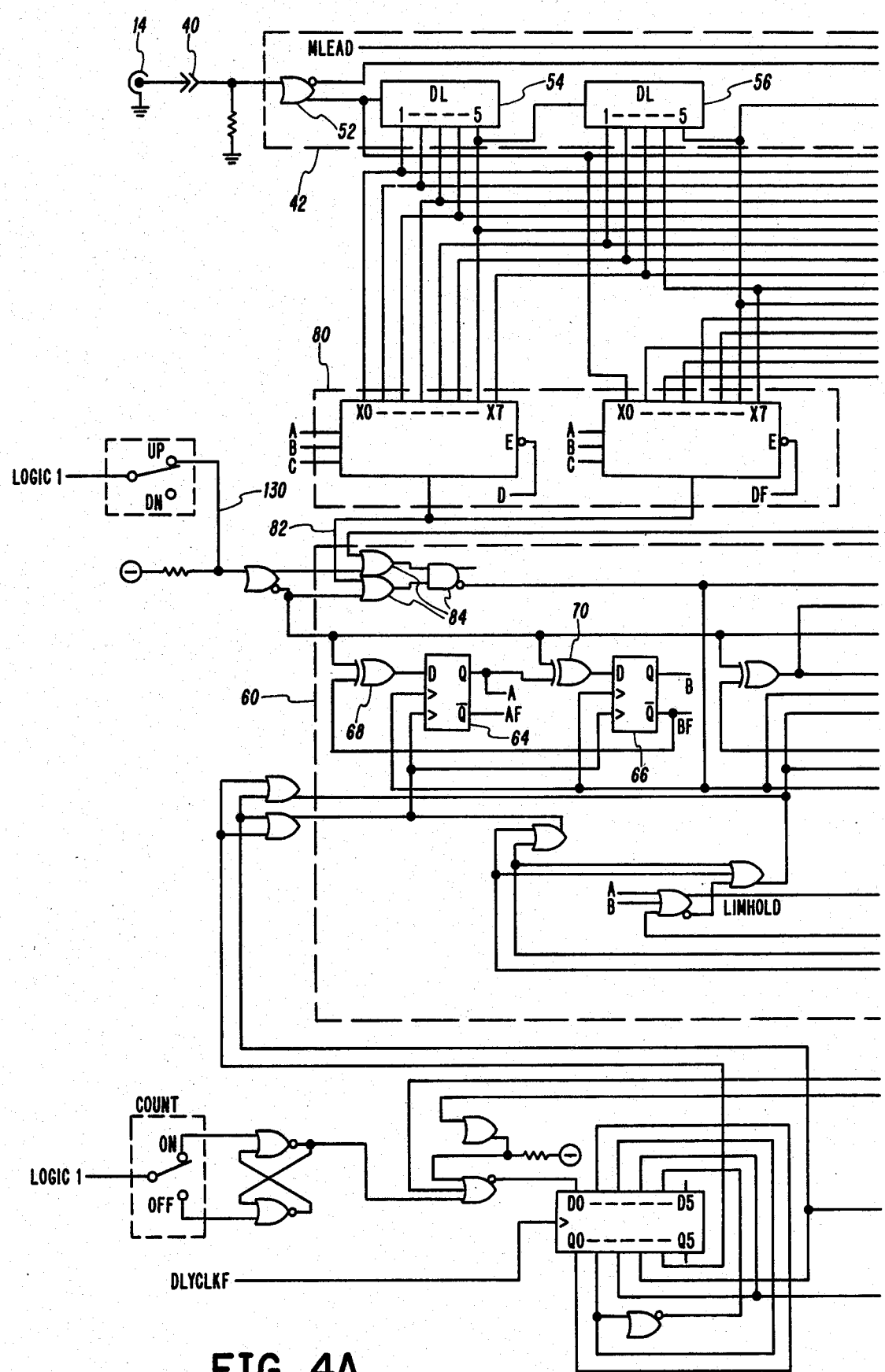
FIG. 4, comprised of FIGS. 4A and 4B, is a schematic representation of the gray code counting means, clock delay line and clock multiplexers used in the multiple data path simulator of FIG. 2.
Figure 4B:
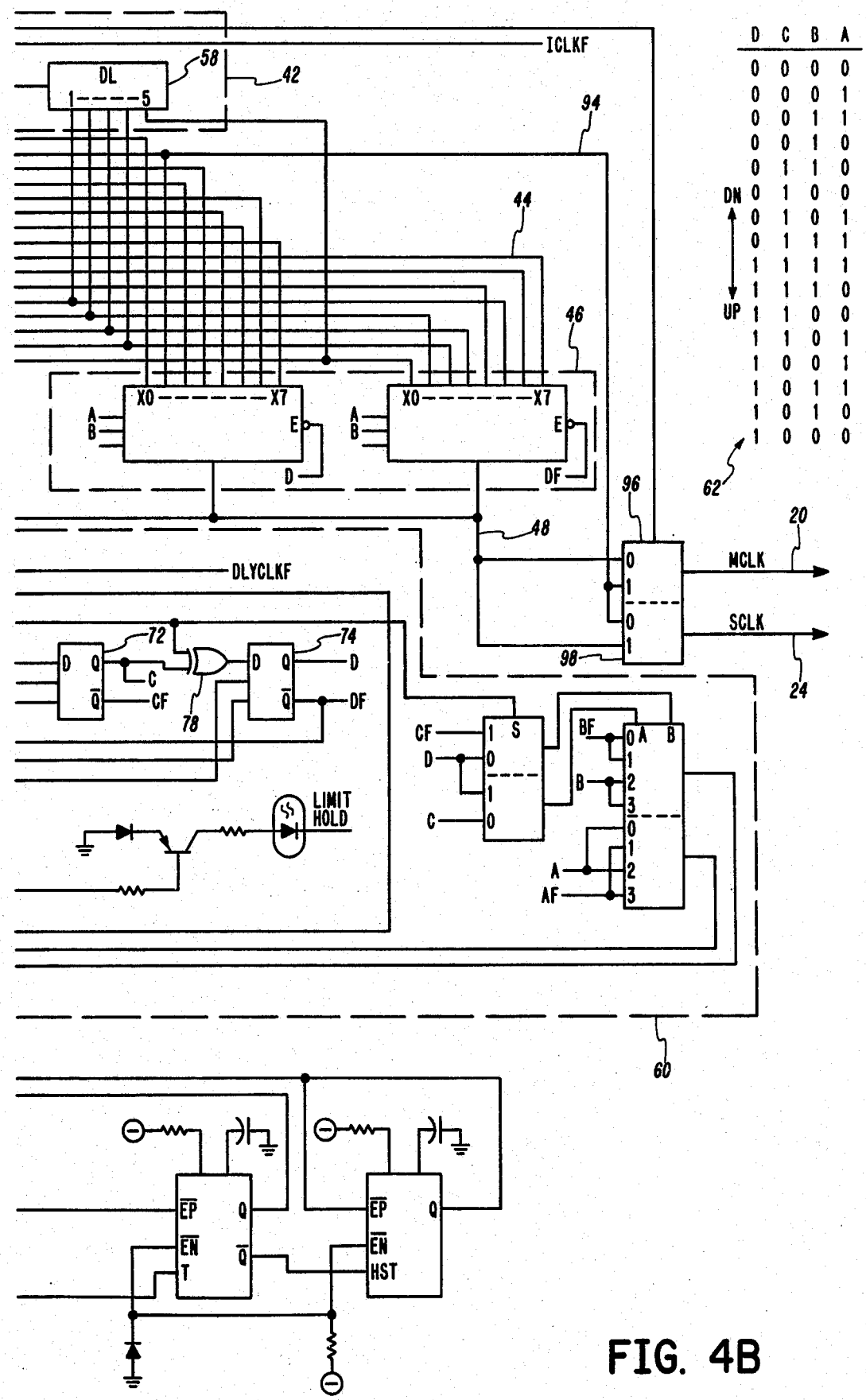

Referring now to FIG. 2 and FIG. 4, multiple data path simulator 10 includes means such as cable connector 40 for supplying a reference clock signal through clock connection 14 from data generator 12. Means for delaying the reference clock signal includes means such as delay line 42 for delaying clock signal from the clock output of the data generator, with a predetermined number of outputs 44 of differing time delays, and a clock multiplexer 46 for selecting as an output 48 one of the outputs 44 of clock signal delay line 42. A connection 50 directly from cable connector 40 is merely considered a delay of zero and is chosen as a reference clock signal. In the specific embodiment illustrated, the predetermined number is sixteen.

In one arrangement, delay line 42 includes a gate 52 feeding a series of three ECL delay lines 54, 56 and 58. Means 60 for counting up or down in a gray code sequence corresponding to the predetermined number of outputs 44 has outputs A, B, C and D which count up and down in a gray code sequence 62. Gray code counting means 60 includes two 2-bit counters. One comprising flip-flops 64 and 66 and exclusive-or gates 68 and 70. The other 2-bit counter is similarly constructed with flip-flops 72 and 74 and exclusive-or gates 76 and 78.

Figure 3:
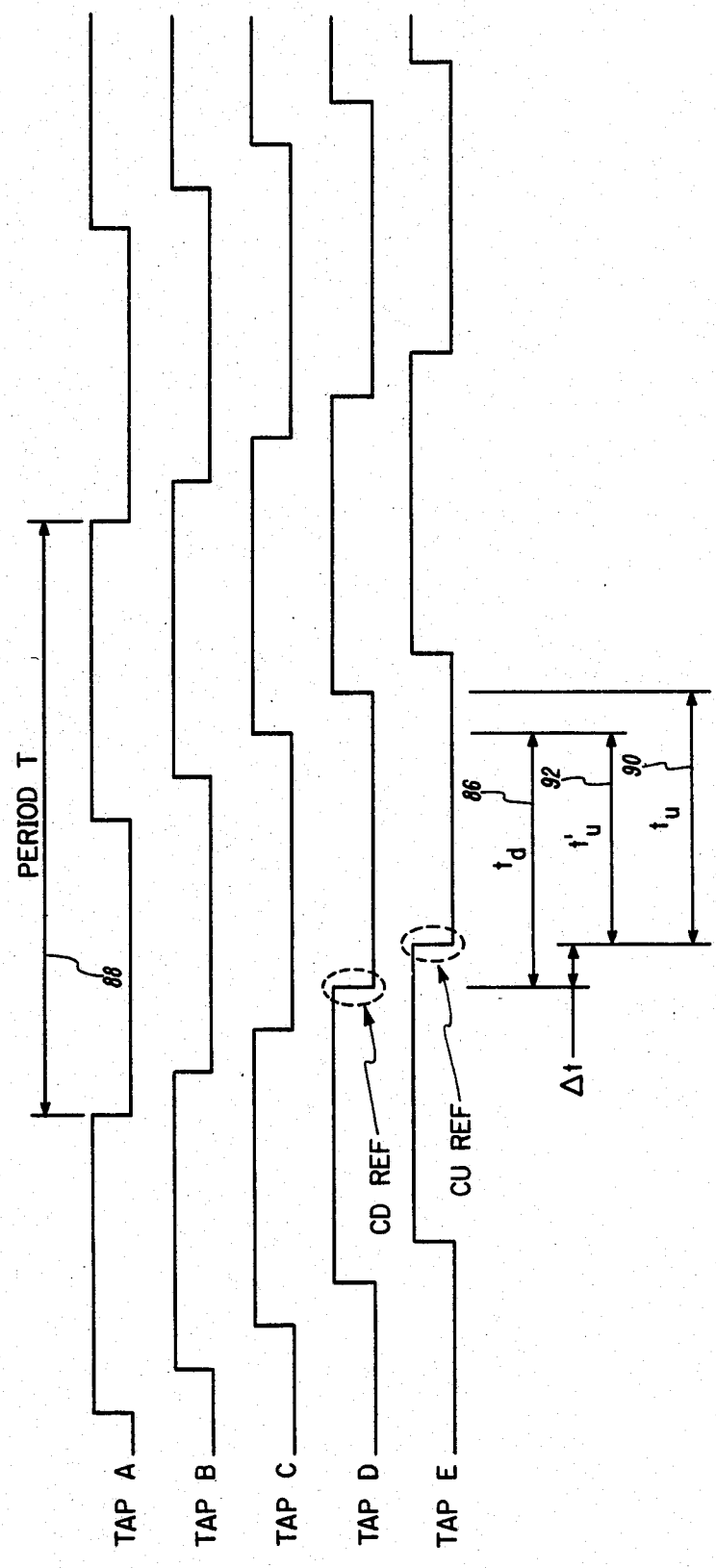
FIG. 3 is a timing diagram of the outputs of a delay line used in the multiple data path simulator of FIG. 2.

Multiple data path simulator 10 further includes a second clock multiplexer 80 being substantially the same as first clock multiplexer 46. Second clock multiplexer 80 is connected in a way that its output is always one delay time later than the output of first clock multiplexer 46. Output 48 of multiplexer 46 and output 82 of second multiplexer 80 are both fed to gray code counting means 60. Gray code counting means 60 selects the output of only one of the two multiplexers for its clock, selecting the output of the first clock multiplexer 46 when counting down and selecting the output of second clock multiplexer 80 when counting up. Referring also to FIG. 3, where the Delta-T represents the tap-to-tap delay of the delay lines, a symetrical clock at five different taps is shown. For purposes of illustration, assume only the edge marked "CD ref" is considered. When the multiplexer selects tap D, it is possible to count up to tap E for greater delay or to count down to tap C for less delay. If moving in a direction of greater delay, and propagation delays in the circuit are less than Delta T, moving from tap D to tap E could generate a "glitch", because the change started after D went low but reached tap E before it went low. This would be a problem if the tap-to-tap delay is less than the circuit propagation delays. Providing second clock multiplexer 80 to provide the next number delay eliminates the problem. Data is thus always clocked with first clock multiplexer 46, but the clock used by gray code counting means 60 will be taken from either multiplexer by selection gating 84. Count-down delay time 86 is the total propagation delay allowed for count-down and for a 50% duty cycle is equal to one-half timing period 88 minus Delta T. Count-up delay time 90 is the total propagation delay allowed for count-up and is also equal to one-half of timing period 88 minus Delta T. The single multiplexer count-down delay time 92 is the total propagation time allowed for count-down if output 48 of first clock multiplexer 46 were used for both count-up and count-down and equals one-half timing period 88 minus twice Delta T.

Multiple data path simulator 10 also includes means for determining between selected output 48 and a reference output 94 which is a main clock output 20 and which is a standby clock output 24. Such means includes in one arrangement two multiplexers 96 and 98. Clock reference 94 is connected to one input of main clock multiplexer 96 and the opposite input of standby clock multiplexer 98. Similarly, selected output 48 is connected to the input of standby clock multiplexer 98 corresponding to the connection of reference clock 94 to main clock multiplexer 96 and is connected to the opposite input of main clock multiplexer 96. Multiplexers 96 and 98 are always switched together so that either the reference clock 94 or selected clock 48 is chosen as the main clock, and the other is chosen as the standby clock.

Figure 5:
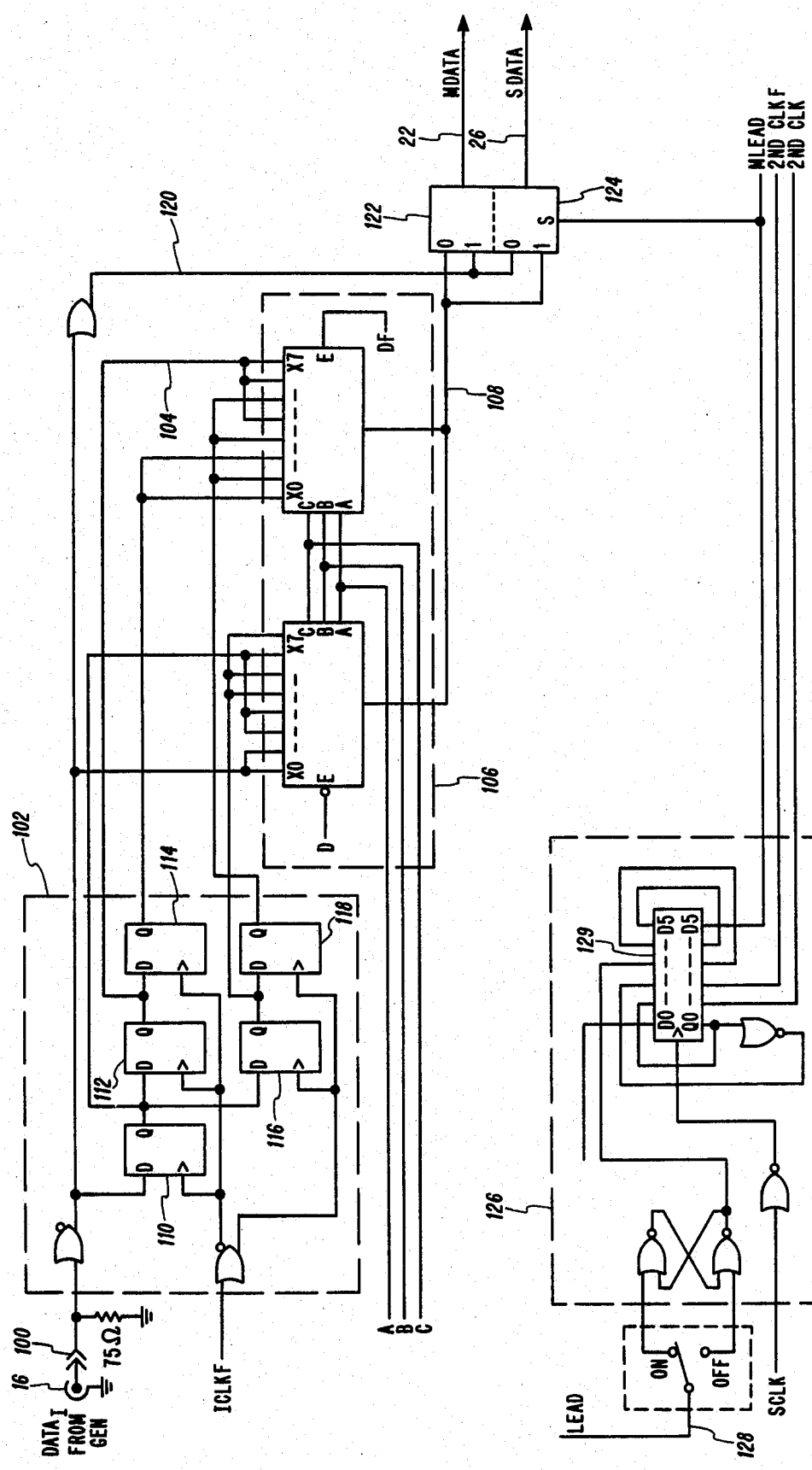
FIG. 5 is a schematic representation of the data delay register, data multiplexers and lead/lag control used in the multiple data path simulator of FIG. 2.

Referring now also to FIG. 5, multiple data path simulator 10 also includes means such as connector 100 for supplying a reference data signal through data connection 16 from data generator 12. Means for delaying the reference data signal a selected time includes means such as delay register 102 for delaying data from data output 16 of data generator 12 with a predetermined number of outputs 104 of different time delays corresponding to the predetermined number of outputs 44 of delay line 42. A data multiplexer 106 selects as an output 108 one of the outputs 104 of delay register 102. Delay register 102 is constructed from an array of five flip-flops 110, 112, 114, 116 and 118 in one arrangement.

Means for determining between selected data output 108 and a reference data output 120 which is the main data output 22 of the simulator and which is the standby output 26 includes two multiplexers, a main data multiplexer 122 and a standby data multiplexer 124. Reference data output 120 is connected to inputs of multiplexers 122 and 124 corresponding to the connections of reference clock output 94 to multiplexers 96 and 98. Likewise, selected data output 108 is connected to the inputs of multiplexers 122 and 124 corresponding to the inputs of multiplexers 96 and 98 to which selected clock output 48 is connected. Thus, both reference clock output 94 and reference data output 120 are selected as the main outputs or both are selected as the standby outputs. Similarly, both selected clock output 48 and selected data output 108 are determined to be main outputs or both are determined to be standby outputs. A lead/lag control 126 is also part of the means for determining between main and standby outputs. Lead/lag control 126 includes a register 128 for capturing data to be synchronized with the clock, and it toggles the four multiplexers 96, 98, 122 and 124 together so that one set of clock and data is chosen as the main outputs and the others chosen as the standby outputs at any given time.

Both lead/lag control 126 and gray code counting means 60 can be controlled by manual switches 38 through connections 128 and 130 respectively. In the present embodiment the counter 60 is operated at a count rate that provides a specified dynamic rate of change for the time delay.

From the foregoing it will be seen that this invention is one well adapted to obtain all of the ends and objects hereinabove set forth, together with other advantages which the obvious and which are inherent to the apparatus. It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted by illustrative and not in a limiting sense.

I claim:
1. A multiple data path simulator for use with a data generator having a clock output and a data output, the simulator comprising in combination:
   means for delaying data from the data output of the data generator, with a predetermined number of outputs of differing time delays;
   a data multiplexer for selecting as an output one of the outputs of the data delaying means;

means for delaying clock signal from the clock output of the data generator, with outputs of differing time delays corresponding to the differing time delays of the data delaying means;

a clock multiplexer for selecting as an output one of the outputs of the clock signal delaying means; and means for counting up or down in a gray code sequence corresponding to the predetermined number of outputs, wherein the data multiplexer and the clock signal multiplexer select from the outputs of the data delaying means and the clock signal delaying means respectively responsive to the counting means.

2. A multiple data path simulator according to claim 1 wherein a predetermined output of the data delaying means and the corresponding output of the clock signal delaying means also function as reference outputs, further including means operably connected to (a) the selected outputs of the data multiplexer and the clock signal multiplexer and (b) the reference outputs for determining which are main outputs of the simulator and which are standby outputs.

3. A multiple data path simulator according to claim 2 wherein the data delaying means comprises a delay register and the clock signal delaying means comprising a delay line.

4. A multiple data path simulator according to claim 3 further comprising a second clock multiplexer, being substantially the same as the first clock multiplexer, wherein the second clock multiplexer is operably connected to the outputs of the clock signal delaying means in a way that its output is always one delay time later than the output of the first clock multiplexer and wherein the gray code counting means selects the output of the first clock multiplexer for its clock signal when counting down and selects the output of the second clock multiplexer for its clock signal when counting up.

5. A multiple data path simulator according to claim 4 wehrein the means for determining main outputs and standby outputs includes a main clock multiplexer, a standby clock multiplexer, a main data multiplexer and a standby data multiplexer wherein the main clock multiplexer selects between the selected clock output and the reference clock output and the standby clock multiplexer selects the clock output not chosen by the main clock multiplexer and wherein the main data multiplexer selects between the selected data output and the reference data output and the standby data multiplexer selects the data output not chosen by the main data multiplexer.

6. A multiple data path simulator according to claim 2 further comprising a second clock multiplexer, being substantially the same as the first clock multiplexer, wherein the second clock multiplexer is operably connected to the outputs of the clock signal delaying means in a way that its output is always one delay time later than the output of the first clock multiplexer and wherein the gray code counting means selects the output of the first clock multiplexer for it clock signal when counting down and selects the output of the second clock multiplexer for its clock signal when counting up.

7. A multiple data path simulator according to claim 2 wherein the means for determining main outputs and standby outputs includes a main clock multiplexer, a standby clock multiplexer, a main data multiplexer and a standby data multiplexer wherein the main clock multiplexer selects between the selected clock output and the reference clock output and the standby clock multiplexer selects the clock output not chosen by the main clock multiplexer and wherein the main data multiplexer selects between the selected data output and the reference data output and the standby data multiplexer selects the data output not chosen by the main data multiplexer.

8. A multiple data path simulator according to claim 1 further comprising a second clock multiplexer, being substantially the same as the first clock multiplexer, wherein the second clock multiplexer is operably connected to the outputs of the clock signal delaying means in a way that its output is always one delay time later than the output of the first clock multiplexer and wherein the gray code counting means selects the output of the first clock multiplexer for its clock signal when counting down and selects the output of the second clock multiplexer for its clock signal when counting up.

9. A multiple data path simulator comprising in combination:

means for supplying a reference clock signal and a reference data signal;

means for counting up or down in a gray code sequence; and means for delaying the reference clock signal and the reference data signal a selected time which increases or decreases responsive to the gray code counting means.

10. A multiple data path simulator according to claim 9 further comprising means operably connected to the delayed signals and the reference signals for determining which are main outputs and which are standby outputs.

* * * * *